Figure 1:
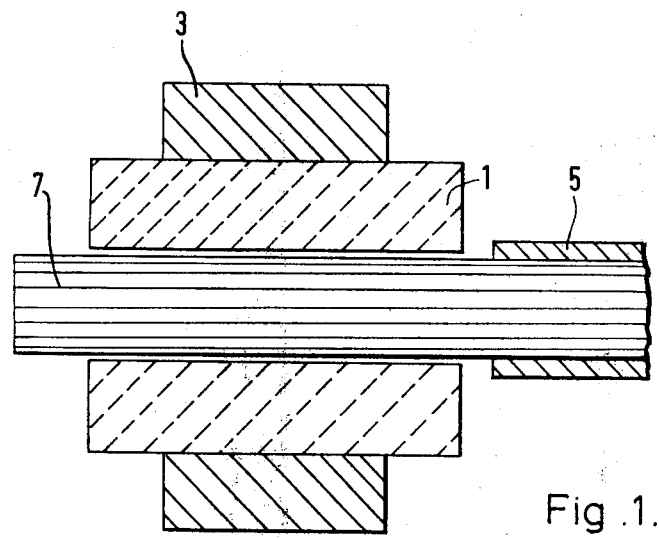

United States Patent [19]

Lewis

[11] 4,261,721
[45] Apr. 14, 1981

[54] TERMINATING OPTICAL FIBER CABLES

[75] Inventor: Edward L. Lewis, Maidstone, England

[73] Assignee: Elliott Brothers (London) Limited, Chelmsford, England

[21] Appl. No.: 48,744

[22] Filed: Jun. 15, 1979

[30] Foreign Application Priority Data

Jul. 18, 1978 [GB] United Kingdom ............... 30209/78

[51] Int. Cl.³ ........................ B23K 1/02; C03B 37/00; C03C 27/02
[52] U.S. Cl. ...................... 65/4 B; 65/59 B; 350/96.22
[58] Field of Search ............... 65/4 B, 59 B; 350/96.22

[56] References Cited

U.S. PATENT DOCUMENTS

| | | | |
|---|---|---|---|
| 3,225,132 | 12/1965 | Baas et al. | 65/59 B X |
| 3,912,362 | 10/1975 | Hudson | 350/96.2 |
| 3,999,837 | 12/1976 | Bowen et al. | 350/96.22 |
| 4,033,668 | 7/1977 | Presby | 65/59 B X |
| 4,078,910 | 3/1978 | Dalgoutte | 65/4 B X |
| 4,116,655 | 9/1978 | Lewis | 65/4 B |

FOREIGN PATENT DOCUMENTS 1465493  2/1977  United Kingdom ...................... 65/4 B Primary Examiner—Robert L. Lindsay, Jr.
Attorney, Agent, or Firm—Kirschstein, Kirschstein, Ottinger & Cobrin

[57] ABSTRACT

A method of terminating an optical fiber cable wherein an annular deformable member (1) is compressed inwardly onto a cable (7) threaded through it by causing an encircling cincture (3) exhibiting 'memory' properties to try to return to a remembered shape and size.

9 Claims, 2 Drawing Figures

TERMINATING OPTICAL FIBER CABLES

This invention relates to methods of terminating optical fibre cables.

In arrangements making use of optical fibre cables it is generally convenient for the cables to be in manageable lengths provided with terminations whereby the lengths may be coupled together or to associated devices which the cables serve to interconnect.

Whilst various methods of terminating optical fibre cables have been proposed there is always a difficulty in obtaining a satisfactory compromise between the need to provide a termination which is sound mechanically and in respect of light transmission, and the desirability of providing a termination which can easily be fabricated in the field.

It is an object of the present invention to provide a method of terminating an optical fibre cable which alleviates this difficulty.

According to the invention a method of terminating an optical fibre cable comprises inserting the cable into the passageway through an annular deformable member and compressing said deformable member inwardly to secure said cable within the passageway by causing a cincture of material exhibiting shape and size memory properties which encircles said deformable member to try to return to a remembered shape and size.

In a preferred method in accordance with the invention the cincture is first subjected to a treatment which causes it to try to return to its remembered size and shape and thereby exert a compressive force on the deformable member and subsequently the deformable member is subjected to a treatment which allows it to deform inwardly under the force exerted by the cincture.

The treatments to which the cincture and deformable member are subjected are preferably heat treatments.

Preferably the cincture heat treatment comprises raising its temperature above a critical temperature below the lowest required operating temperature of the termination and the deformable member heat treatment comprises raising its temperature above the highest required operating temperature of the termination.

The cable may comprise a single optical fibre or a bundle of two or more optical fibres.

In one particular arrangement in accordance with the invention suitable for use where the cable comprises a bundle of optical fibres the deformable member is a unitary member consisting of deformable material. In one such particular method where the deformable member is subjected to a heat treatment to allow it to deform, the heat treatment also softens the optical fibres so that under the force exerted by the cincture they are deformed, without any substantial fusion, to eliminate to a substantial extent any spaces between the fibres.

Figure 2:
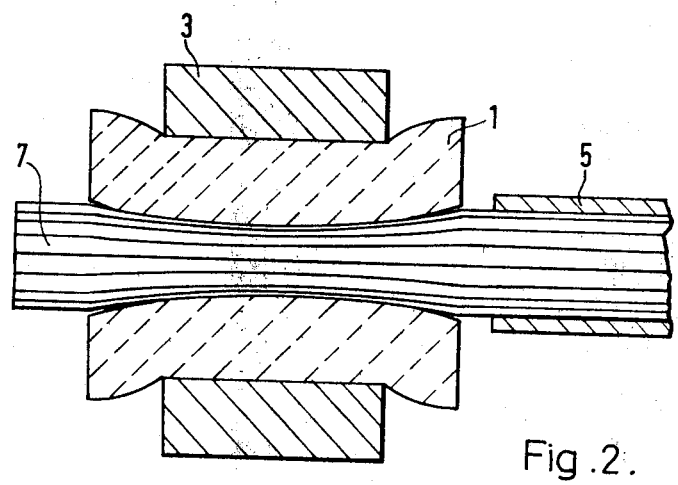

One method in accordance with the invention will now be described by way of example with reference to the accompanying drawings in which FIGS. 1 and 2 are diagrammatic sectional views respectively illustrating two stages of the method.

Referring to FIG. 1, in the method use is made of a unitary heat deformable annular member in the form of a glass ferrule 1 and a cincture in the form of a ring 3. The ring 3 consists of a metal alloy, known per se, such as a brass-aluminum alloy or a nickel-titanium alloy which exhibits shape and size memory properties so that if deformed at a temperature below a critical temperature, determined by the alloy composition, the ring will try to return to its original shape and size when raised above the critical temperature.

For use in forming a particular termination an alloy is chosen whose critical temperature is below the lowest temperature at which the termination is required to operate, and the ring is initially formed with an internal diameter appreciably smaller than the external diameter of the ferrule 1. The temperature of the ring 3 is then reduced below the critical value and the ring 3 is mechanically expanded so that it is a sliding fit on the ferrule 1. The ring 3 is then positioned centrally on the ferrule 1 and raised to a temperature, e.g. room temperature, above the critical value so that it tries to contract and exerts a compressive force on the ferrule 1, thereby securing the ring 3 on the ferrule 1.

After suitable preparation, e.g. by stripping back the outer protective cable sheath 5 and squaring off the fibre ends, a bundle of optical fibres 7 is threaded through the passageway in the ferrule 1. Heat is then applied to the assembly to raise it to a temperature, e.g. between 520° C. and 580° C., sufficient to cause the fibres 7 and the ferrule 1 to soften without fusing them. The force exerted by the ring 3 in attempting to return to its original smaller size and shape radially inwardly compresses the softened ferrule 1 and the fibres 7 within it, as shown in FIG. 2. Under the compressive force the fibres 7 are gently deformed from their circular shape to a generally hexagonal shape in which they interlock and occupy the available cross-sectional area substantially completely. By avoiding fusing of the fibres 7 to any substantial extent the individual form of the fibres 7 is retained and brittleness of the fibres and loss of light by escape through fused surfaces is avoided.

Finally, the ends of the fibres 7 are ground and polished or cleaned to reveal a mosaic of compressed fibre ends.

Heat is conveniently applied to the assembly by means of a tool in the form of an apertured block (not shown) which receives the assembly shown in FIG. 1 and transfers heat thereto by conduction.

The method can also be used to terminate a large single optical fibre cable (not shown). In this case however, deformation of the fibre is not required and the amount of compression of the ferrule 1 by the ring 3 is just sufficient to cause the ferrule 1 to securely grip the fibre. The degree of compression can be controlled by suitably choosing the dimensions, initial expansion and critical temperature of the ring.

It will be appreciated that since the insertion of the optical fibres 7 into the ferrule 1 and heating of ferrule 1 and fibres 7 are relatively easy steps and can be carried out at a different location from the earlier steps and at any desired time after the earlier steps, the method is particularly adapted for use in the fabrication of terminations by unskilled labour in the field.

I claim:

1. A method of terminating an optical fibre cable comprising inserting the cable into the passageway through an annular deformable member and constricting said deformable member inwardly to secure said cable within the passageway by encircling said member with a cincture of material exhibiting shape and size memory properties which tries to return to a remembered smaller shape and size.

2. A method according to claim 1 wherein the cincture is first subjected to a treatment which causes it to try to return to its remembered smaller size and shape and thereby exert a constrictive force on the deformable member and subsequently the deformable member is subjected to a treatment which allows it to deform inwardly under the force exerted by the cincture.

3. A method according to claim 2 wherein the annular member is heat-deformable, wherein the treatment to which the cincture is subjected is one which enables the return to remembered size by heating of the cincture, and wherein the treatments to which the cincture and deformable member are subjected are heat treatments.

4. A method according to claim 3 wherein the cincture heat treatment comprises raising its temperature above a critical temperature below the lowest required operating temperature of the termination and the deformable member heat treatment comprises raising its temperature above the highest required operating temperature of the termination.

5. A method according to claim 1 wherein the deformable member is a unitary member consisting of deformable material.

6. A method according to claim 5 wherein the cable comprises a plurality of optical fibres and wherein the deformable member is subjected to a heat treatment to allow it to deform and the heat treatment also softens the optical fibres so that under the force exerted by the cincture they are deformed, without any substantial fusion, to eliminate to a substantial extent any spaces between the fibres.

7. A method according to claim 5 wherein the deformable member consists of glass.

8. A method according to claim 1 wherein the cincture consists of an alloy of nickel and titanium.

9. A component for use in terminating an optical fibre, said component comprising
  (A) an annular heat-deformable member and
  (B) a cincture exhibiting shape and size memory properties encircling said heat-deformable member and exerting an inwardly compressive force on the heat-deformable member by virture of trying to return to its remembered size and shape
  (C) so that the heat-deformable member when heated will deform inwardly under the force exerted by the cincture to secure an optical cable inserted into the passageway through the heat-deformable member.

* * * * *